No. 825,821. PATENTED JULY 10, 1906.
I. W. GILES & C. W. TOBEY.
WHEEL.
APPLICATION FILED DEC. 5, 1905.
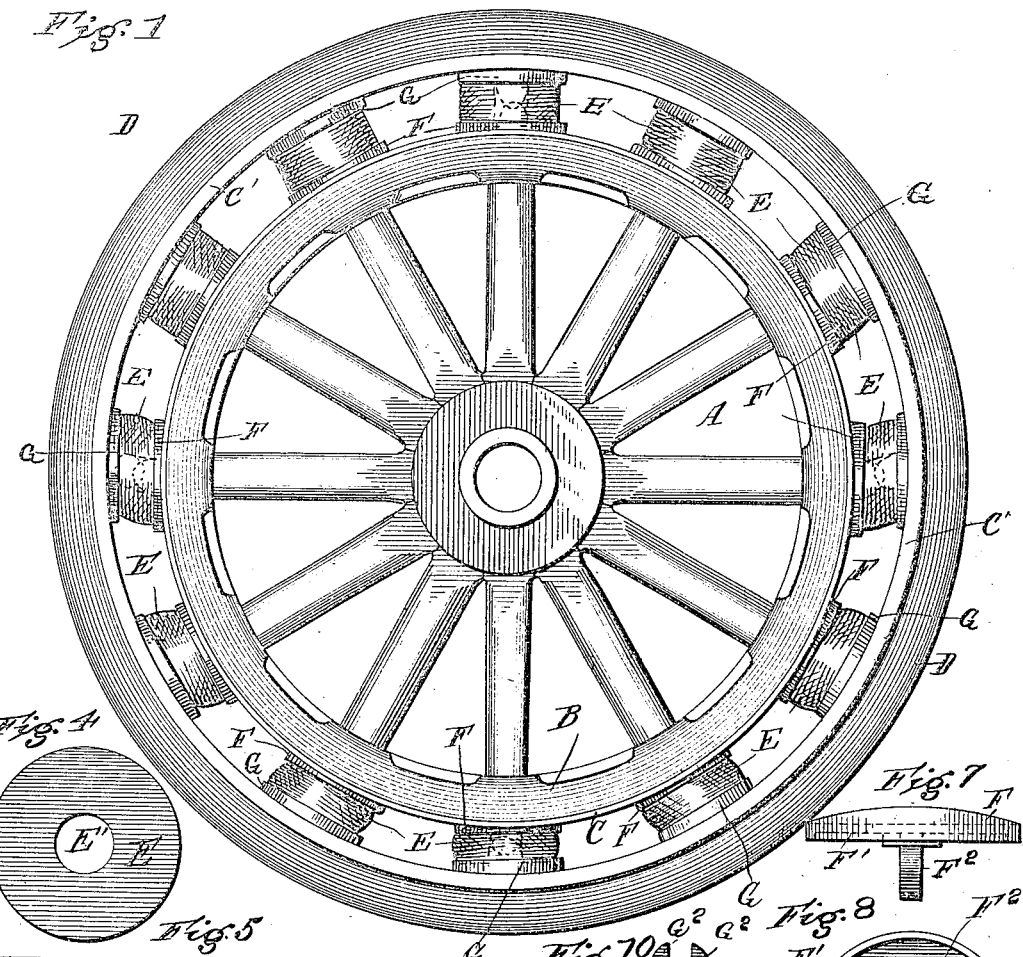
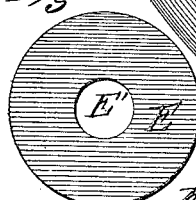
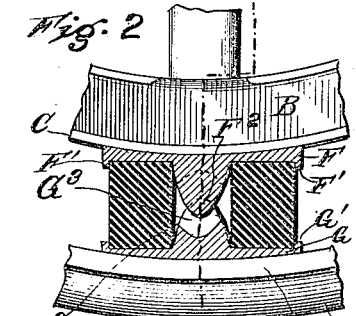
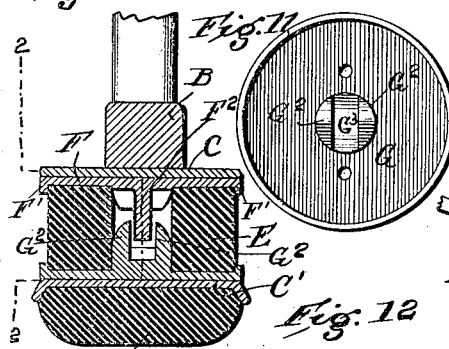
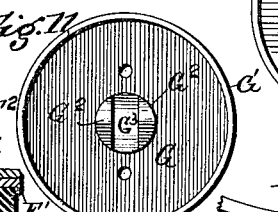
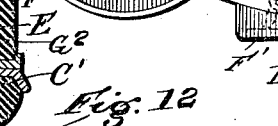
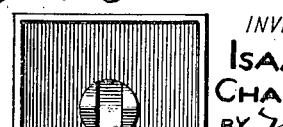
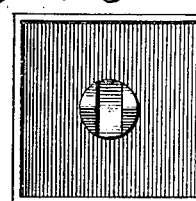
INVENTORS
ISAAC W. GILES
CHARLES W. TOBEY
BY Munn & Co.
ATTORNEYS

UNITED STATES PATENT OFFICE.

ISAAC W. GILES, OF NEW BEDFORD, AND CHARLES W. TOBEY, OF FAIRHAVEN, MASSACHUSETTS.

WHEEL.

No. 825,821.   Specification of Letters Patent.   Patented July 10, 1906.

Application filed December 5, 1905. Serial No. 290,418.

*To all whom it may concern:*

Be it known that we, ISAAC W. GILES, a resident of New Bedford, and CHARLES W. TOBEY, a resident of Fairhaven, in the county of Bristol and State of Massachusetts, citizens of the United States, have made certain new and useful Improvements in Wheels, of which the following is a specification.

This invention is an improvement in wheels, and especially in wheels designed for use on automobiles and the like wherein a cushioning and a strong traction effect is desired; and the invention consists in certain novel constructions and combinations of parts, as will be hereinafter described and claimed.

In the drawings, Figure 1 is a side elevation of a wheel embodying the invention. Fig. 2 is a sectional view on about line 2 2 of Fig. 3. Fig. 3 is a section on about line 3 3 of Fig. 2. Fig. 4 is an end view, and Fig. 5 a side view, of one of the cushion-blocks. Fig. 6 is a side view of one of the block-holders. Fig. 7 is an end view of the same block-holder. Fig. 8 is a face view of the cushion-holder shown in Fig. 7. Figs. 9 and 10 are side and edge views of the socket-holder for application to the tire. Fig. 11 is a face view of said cushion-holder, and Fig. 12 is a view of a rectangular cushion-block holder.

By the invention we provide a wheel comprising a body portion A, having its rim composed of the felly B and the plate C, the tire spaced away from the rim of the body A and comprising the tire-plate C' and the rubber rim D, the cushion-blocks E between the wheel and the rim, and the holders F and G for the said cushion-blocks.

The cushion-blocks E are preferably of rubber and may be of any desired shape; but it is preferred to make them cylindrical in cross-section, as shown in Fig. 4, with their ends square or flat, as shown in Fig. 5, whereby to keep the blocks in place and prevent any tendency to roll in line with the traction, and also to form the said blocks with central openings E' to receive the devices, by which to brace the blocks against lateral displacement as well as against movement in the direction of the circumference of the wheel when the blocks are compressed.

In securing the blocks in place we prefer to employ the inner and outer holders F and G, secured, respectively, to the outer side of the rim of the wheel proper and the inner side of the rim in radial alinement and provided at their upper edges with slightly-projecting beads F' and G' overlapping the ends of the blocks and operating to keep out dirt and the like.

The guide devices within the cushion-blocks E comprise lugs $F^2$, projecting from one of the block-holders and lugs $G^2$, arranged in pairs on the opposite block-holders and between which the lugs $F^2$ project, the outer ends of the lugs $F^2$ being rounded at $F^3$ and the recess or depression at $G^3$ being formed between the lugs $G^2$ at the base of the latter to receive the rounded point of the lug $F^2$ when the cushion-block is compressed to its greatest extent, as shown at the bottom in Fig. 1, in order to prevent any circumferential displacement of the body of the wheel within the rim, the overlapping of the lugs $F^2$ and $G^2$ preventing any lateral displacement in the use of the invention, as will be readily understood.

The cushion-blocks may be round, square, or oval in shape, Fig. 12 illustrating a rectangular form of holder for the same.

In assembling the parts of the wheel it will be understood the blocks E are placed in position under pressure and operate to center the wheel-body within the rim, and while normally under a certain degree of compression will yield in passing over uneven surfaces, stones, and other obstacles found on the ordinary highway.

It will be noticed from the drawings that in practice we provide a wide metal plate C upon the felly of the wheel-body and secure the inner block-holders thereon, the outer block-holders being secured to a broad metal tire-plate and the opposite holders for the block being provided with overlapping projections, which act as braces to prevent too much lateral movement in the use of the invention, also that the engagement of the projections of the inner and outer block-holders with each other under the extreme compression of the cushion-block prevent displacement in line with the traction.

In securing the block-holders in place screws or other suitable fasteners may be employed, screws being indicated in dotted lines in Fig. 6.

The wheel as a whole may be found in practice to possess all the elasticity of a pneumatic tire without many of the troubles incident to such form of tire, the improved wheel being puncture-proof and so constructed that dirt, grit, and mud cannot enter or obstruct the working devices.

Having thus described our invention, what we claim as new, and desire to secure by Letters Patent, is—

1. The improvement in wheels herein described comprising the main wheel-body having a felly and a broad metal tire-plate thereon, the rim having a broad metal plate, the inner and outer cushion-block holders secured respectively to the inner and outer rims and having at their outer edges projecting beads to overlap cushion-blocks and also provided with the projecting lugs, the lugs on one of the holders of each pair extending on opposite sides of the lugs on their coöperating holders whereby to prevent lateral displacement and said holders being recessed between their pairs of lugs to receive the points of the opposing lugs, and the cushion-blocks having the flat ends and provided with the central openings and fitting within their holders with the lugs thereof projecting into the central openings of the cushion-blocks, substantially as set forth.

2. The combination in a wheel with the wheel-body and the rim spaced apart therefrom, of cushion-blocks between the body and rim, and holders receiving said blocks and secured respectively to the wheel-body and to the rim and provided with projecting overlapping lugs operating within the cushion-blocks and adapted to prevent lateral displacement substantially as set forth.

3. The combination of the wheel-body, the rim, the cushion-block between the body and rim and having a central opening, and holders for said block secured to the wheel body and rim and provided with overlapping lugs operating within the central opening of the cushion-block, the said lugs being arranged with a single lug on one holder and with a pair of lugs on the opposite holder lapping on opposite sides of the first lug and the second holder being provided between the lugs of its pair with a recess receiving the point of the single lug all substantially as and for the purposes set forth.

ISAAC W. GILES.
CHARLES W. TOBEY.

Witnesses:
ROBERT BETAGH,
FRANK L. DAVIS.